United States Patent Office 3,399,969
Patented Sept. 3, 1968

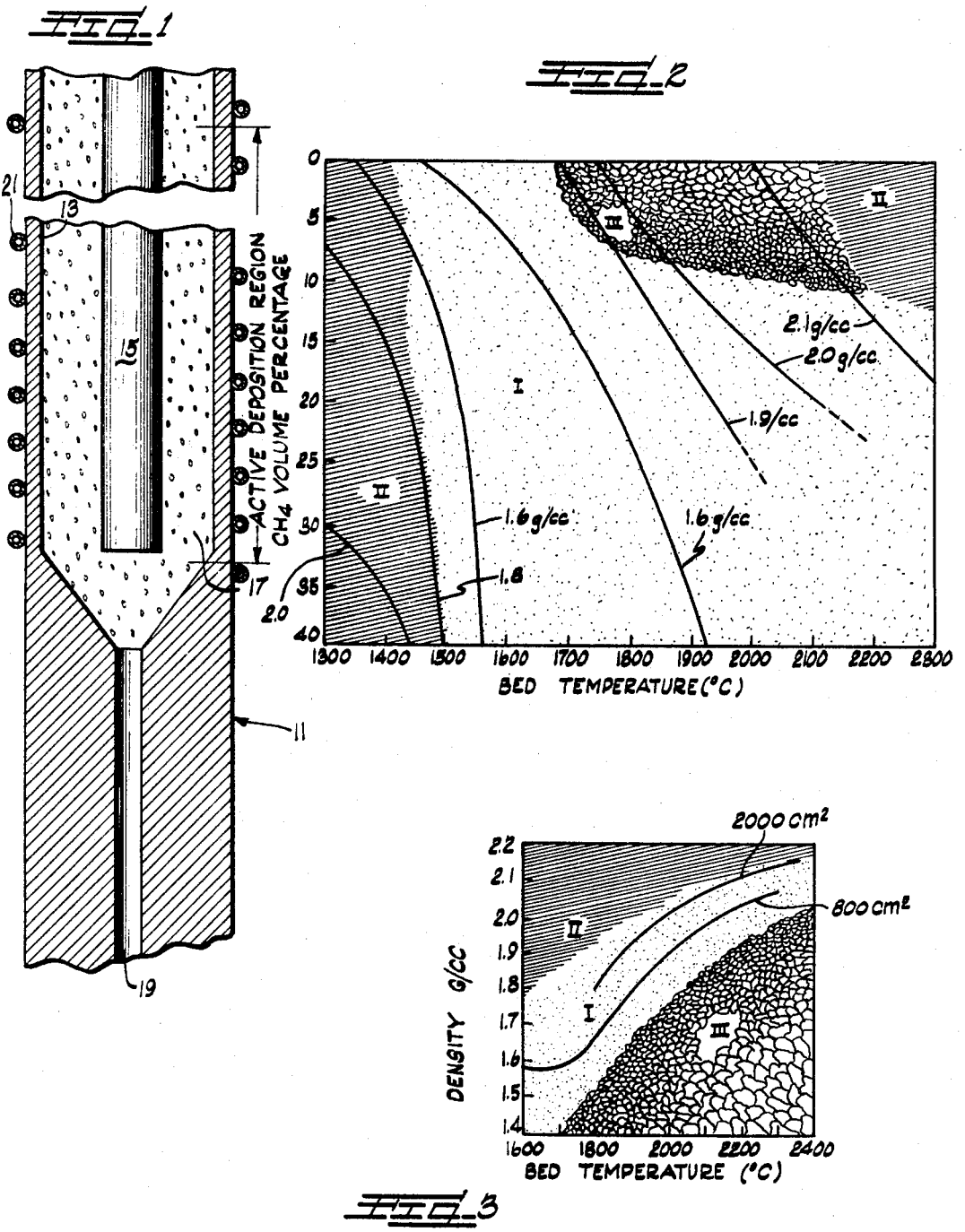

3,399,969
DEPOSITION OF MASSIVE PYROLYTIC CARBON
Jack C. Bokros and Jack Chin, San Diego, and Alan S. Schwartz, Del Mar, Calif., assignors, by mesne assignments, to Gulf General Atomic Incorporated, San Diego, Calif., a corporation of Delaware
Filed Feb. 10, 1966, Ser. No. 526,603
7 Claims. (Cl. 23—209.1)

This application relates to processes for making carbon articles and more particularly to processes for making isotropic pyrolytic carbon articles.

Pyrolytic carbon may be formed by thermally decomposing gaseous hydrocarbons or other carbon-containing substances in the vaporous form. It is known to coat various substrates with pyrolytic carbon to produce a composite article in which the substrate is protected by the pyrolytic carbon layer. It is also known to coat mandrels with a relatively thick layer of pyrolytic carbon, say 10 to 200 mils or greater. In some instances the deposited pyrolytic carbon structure may be removed from the underlying mandrel and employed as a useful article in and of itself. Likewise, the composite coated mandrel may be the end product. Pyrolytic carbon deposited in the above fashion is hereinafter referred to as massive pyrolytic carbon. For purposes of this application, the term massive pyrolytic carbon may be considered to refer to a relatively thick layer of pyrolytic carbon which has been deposited by thermal decomposition of a carbon-containing vapor onto a mandrel of such a size that it cannot be practically levitated in a vapor stream and is accordingly individually supported.

Massive pyrolytic carbon has heretofore been produced by thermal decomposition of gaseous hydrocarbons in suitable furnaces by depositing a layered structure of pyrolytic carbon on a stationary mandrel. Massive pyrolitic carbon structures of this type have various uses, for example rocket and missile nose cones, crucibles and tubes, which require only limited structural strength. Pyrolytic carbon deposited in this manner upon the surface of a mandrel has the form of carbon layers of varying crystallinity which are aligned in planes parallel to the surface of the mandrel upon which it is deposited. The thermal conductivity of such a massive pyrolytic carbon structure varies, being substantially higher in a direction parallel to the layer planes than in a direction perpendicular to the layer planes, and this is disadvantageous for some applications. Such a preferred orientation may also lead to the development of internal stresses during use of the resultant products. Massive pyrolytic carbon having improved physical properties are desired.

It is an object of the present invention to provide a process for the production of massive pyrolytic carbon having improved physical properties. It is another object of the present invention to provide a process for the production of massive pyrolytic carbon having increased structural strength. It is a further object to provide a process for making massive pyrolytic carbon having good thermal conductivity in all directions. These and other objects of the present invention are more particularly set forth in the following description and in the accompanying drawings wherein:

FIGURE 1 is a diagrammatic illustration of apparatus suitable for carrying out processes embodying various of the features of the invention;

FIGURE 2 is a graphic illustration of the physical properties of pyrolytic carbon deposited using a methane-helium mixture at 1 atmosphere total pressure at a contact time of 0.1 second in a 3.8 cm. diameter fluidized bed coating apparatus wherein the initial deposition surface area is about 1000 square centimeters; and FIGURE 3 is a graph showing the effect, upon the density and the crystalline structure of the pyrolytic carbon, which results from the change in the deposition surface area alone, with the other partinent conditions being held constant at the following values: 3.8 cm. diameter fluidized bed coater, 0.2 atm. methane, 0.8 atm. helium, and 0.1 second contact time.

In general, it has been found that massive pyrolytic carbon structures which are isotropic in form can be deposited upon a mandrel when a bed of particles are included in the active region wherein deposition takes place. Isotropic pyrolytic carbon has various improved physical properties over laminar pyrolytic carbon, the crystalline structure of the massive previously obtained. It has been found that the specific form of carbon deposited is dependent upon several variables, including the deposition surface area to void volume ratio present in the coating apparatus being employed. In accordance with previous deposition processes for making massive pyrolytic carbon articles, the available deposition surface area is generally limited to the surface area of the mandrel plus the surface area of the boundary wall of the furnace component surrounding the mandrel. It has been found that by providing a particle bed in the active deposition region in association with the mandrel, the relevant surface area to void volume ratio can be increased to such an extent that the massive pyrolytic carbon which is deposited upon the mandrel is isotropic carbon.

The crystalline structure and the density of the pyrolytic carbon that is deposited on the surface of a mandrel by the thermal decomposition of a vaporous carbon-containing substance are dependent upon several independently variable operating conditions of the coating apparatus being employed. These conditions include, but are not limited to, the temperature of the substrates upon which deposition is taking place, the partial pressure of the vaporous carbon-containing substance, the surface area to volume ratio in the active deposition region of the coating apparatus, the contact time (the average time in which the individual molecules of the carbon-containing vapor are in the active deposition region of the coating apparatus), and the particular overall composition of the atmosphere from which deposition is taking place. Although various of these conditions can be easily regulated within the desired ranges in many different types of coating apparatus, it has been found that, to achieve the relatively high surface area to volume ratio which is believed necessary to deposit dense isotropic carbon upon a mandrel, a coating apparatus is required which can practically maintain a bed of particles in association with the mandrel in the active deposition region. Examples of suitable coating apparatus of this type include, for example, fluidized bed coaters and rotating drum coaters. It is believed that a fluidized bed coater, the preferred type of coater, can most adequately perform this process. Hereinafter, all reference is accordingly made to fluidized bed coaters.

In a fluidized bed coating apparatus, a bed of particles may be easily maintained within a desired region within a heated coating chamber by levitating the particles in an upward flowing gas stream. An inert gas is generally used to initially establish the fluidized bed, which gas is often termed the fluidizing or carrier gas. Any suitable nonreactive gas, as for example helium, argon or nitrogen, may be employed when a hydrocarbon gas is used as the carbon-containing substance.

Any suitable particles may be employed which will maintain their integrity at the temperatures contemplated. Refractory carbides, such as thorium carbide, uranium carbide, titanium carbide, and boron carbide, are an example of one class of compounds which may be used. Particular types of particles may be specifically coated and then recovered and put to practical uses, or inexpensive particles may simply be coated and discarded.

In FIGURE 1, a fluidized bed coating apparatus 11 is diagrammatically illustrated which has a generally cylindrical coating chamber 13 having a conical lower end. A mandrel 15 is positioned axially within the coating chamber 13. A fluidized bed of particles 17 is established by flowing an inert gas upward through the chamber via a lower inlet 19 and introducing particles 17 from the top. The bed of particles 17 and the mandrel 15 are brought up to the desired temperature using any suitable heating device, such as an induction heater or a resistance heater. An induction heating coil 21 is illustrated. When the desired temperature is reached, introduction of the vaporous carbon-containing substance in the upward flowing gas stream is begun. By heating to the desired decomposition temperature before exposure to the carbon-containing substance, close control of thickness and uniformity of the coating deposited is facilitated.

Depending upon the particular carbon-containing substance employed, it may be desirable to use it to the complete exclusion of any inert gas so that it solely serves as the fluidizing gas during deposition. However, normally, the carbon-containing substance is used as a part of a mixture with an inert gas at a suitable partial pressure. In general, suitable carbon-containing substances may be used which are in the vaporous form above about 1000° C. and which can be thermally decomposed to deposit carbon. Combinations of a carbon-containing substance and a reactive gas may also be used, if desired. The lower weight hydrocarbon gases, such as methane, ethane, propane, hexane, ethylene, acetylene, benzene, etc. are the most convenient to use, and methane is preferred.

Isotropic carbon may be defined as a carbon structure which possesses very little preferred orientation and which has a broad range of apparent crystallite sizes and a density which may vary from about 1.4 to about 2.2 grams per cc. The microstructure of isotropic carbon, when viewed metallographically under polarized light, is not optically active and is featureless.

To deposit isotropic pyrolytic carbon on a mandrel, methane is preferably employed in combination with an inert carrier gas, such as helium or argon. Depending upon the structural strength and thermal conductivity desired, the deposition condition may be properly regulated so that the massive isotropic pyrolytic carbon deposited has a density as high as about 2.1 grams per cc. For most purposes, isotropic pyrolytic carbon having a density of at least about 1.6 is considered to have very good structural strength.

The determination whether a carbon structure is isotropic or anisotropic can be made by using X-ray diffraction from which the variations in the intensity of the X-rays diffracted from the layer planes may be used to calculate its Bacon Anisotropy Factor. The Bacon Anisotropy Factor is an accepted measure of preferred orientation of the layer planes in the carbon structure. Technique of measurement and a complete explanation of the scale of measurement is set forth in an article by G. E. Bacon entitled, "A Method for Determining the Degree of Orientation of Graphite" which appeared in the Journal of Applied Chemistry, volume VI, page 477 (1956). For purposes of this application, the term "isotropic" carbon is defined as carbon which measures between 1.0 (the lowest point on the Bacon scale) and about 1.3 on the Bacon scale.

Isotropic carbon can be deposited by the thermal decomposition of a mixture of methane and helium in a fluidized bed coating apparatus under the conditions depicted in FIGURE 2. This graph shows the crystalline form and density of a pyrolytic carbon as a function of the temperature and the specific proportions of the mixture of helium and methane. FIGURE 2 is based upon the conditions occurring in a fluidized bed coater apparatus having a tube diameter of about 3.8 cm. wherein the active region where deposition occurs is about 5 inches (12.7 cm.) and wherein the initial deposition surface area in the active region is about 1000 sq. cm. The upward flow rate of gas equals about 10,000 cc. per minute measured at room temperature and a pressure of one atmosphere which computes to a contact time of about 0.1 second. The computation of contact time is accomplished by using the following relationship:

$$\text{Contact time} = \frac{\text{fluid bed hot zone volume}}{\text{rate of gas flow}}$$

The fluid bed hot zone volume is the volume of the hot zone less that space taken up by the mandrel and particles. The rate of gas flow is measured at the deposition conditions, the room temperature rate may be converted to deposition temperature rate using the direct relation of the temperature measured in degrees Kelvin, that is:

Rate at disposition conditions =

$$\frac{T_{\text{deposition}} (°K)}{T_{\text{room}} (°K)} \times \text{rate at room temperature conditions}$$

The total pressure of the gas mixture upon which FIGURE 2 is based is about one atmosphere although it should be realized that a total pressure within a reasonable range above or below one atmosphere may be employed in the fluidized bed coater without altering the crystalline form of the pyrolytic carbon deposited. In FIGURE 2, area I denotes isotropic carbon, area II denotes laminar carbon and area III denotes granular carbon. Likewise, it should be realized that the particular carbon-containing substance which is employed will dictate the critical operating conditions for the process and that the operating conditions upon which FIGURE 2 is based are illustrative of a methane-helium mixture.

FIGURE 3 illustrates the effect of the amount of surface area in the fluidized bed on the density and the crystalline structure of the carbon deposited as a function of deposition temperature. FIGURE 3 is based upon an active deposition region volume of about 140 cc., a methane concentration of about 20 percent and a contact time of about 0.1 second. For the aforementioned conditions and surface areas between about 700 cm.$^2$ and about 2500 cm.$^2$, isotropic carbon is deposited at all deposition temperatures above about 1600° C. as shown by the region in FIGURE 3 labeled as I. At high temperatures, high density deposits are obtained, with the density increasing with increased surface area. It should be noted however, that if the surface area exceeds about 2500 cm.$^2$ for the above conditions, the deposit will begin to acquire a preferred orientation. The region labeled as II in FIGURE 3 approximates the region where a carbon having a preferred orientation is deposited at very high surface areas. For each set of conditions (deposition temperature, methane concentration, and contact time) there is a limiting value for surface area, above which the deposits become oriented, and isotropic or near isotropic carbons are not formed. The existence of laminar carbons at high deposition temperatures is further illustrated by region II in the upper right-hand corner of FIGURE 2, which region will expand to lower deposition temperatures and higher methane concentrations for larger surface areas. If the bed surface area goes below a value of about 700 cm.$^2$ for the above conditions the carbon deposited becomes granular having a small crystalline size which size increases with increasing temperature and decreasing surface area until it becomes columnar, as exemplified by region III in FIGURE 3. Therefore, for any given set of the three deposition parameters listed above isotropic carbon of varying density will only be deposited within certain bounds of surface area.

It is considered that the ratio of the surface area to the void volume, using the same basic units of measurement, should be at least about 5 to 1 and no greater than about 20 to 1 to assure the deposition of isotropic pyrolytic carbon. The surface area is determined by summing the areas of the mandrel, coater wall, and fluidized particles. The void volume is that volume remaining after the space taken by the mandrel and fluidized particles is subtracted from the total volume of the active deposition hot zone. Although it is uncertain precisely why the surface area to void volume ratio is technically critical, it is believed that a relatively large amount of total deposition surface area, which will result from the introduction of particles into the hot zone, brings about an efficient transfer of heat to the passing gas stream allowing it to become saturated with carbon. The increased heat transfer causes the carbon producing reaction to occur in the gas phase. The carbon formed in the gas phase deposits as an isotropic carbon. Lower surface area to void volume ratios result in less efficient heat transfer to the gas stream which inhibits the formation of a gas phase carbon causing possible formation of granular carbon. When the upper limit is exceeded all the carbon available is used by the large surface area before the gas stream can become saturated with carbon thereby causing the inability of the carbon producing reaction to occur in the gas phase which results in a deposit having a preferred orientation.

However, as stated above, the other operating conditions, e.g. temperature, contact time, partial pressures, etc., should also be within the proper ranges for isotropic pyrolytic carbon to be formed (see FIGS. 2 and 3 for example), but these are clearly interdependent on one another. For practical operating conditions, the contact time should preferably be not less than about 0.05 second.

In one example of a process for depositing massive isotropic carbon, a fluidized bed coating apparatus 11 is employed similar to that illustrated in FIGURE 1. The particular coating apparatus has an internal diameter of about 3.8 centimeters in the cylindrical portion of the chamber 13. A mandrel 15 in the form of a ½ inch (1.27 cm.) diameter graphite rod is supported centrally within the coating apparatus 11 in the location illustrated. An upward flow of helium is established through the inlet 19 at about 1000 cc. per minute, and the induction coil 21 is energized to heat about a 5-inch long portion of the mandrel 15 and surrounding tubular wall up to a temperature of about 2000° C.

With this arrangement, based upon a 5-inch long active deposition region, the approximate void volume of the region is equal to the volume of this portion of the cylindrical chamber 13 (about 144 cc.) minus the volume of a 5-inch section of the mandrel (about 16 cc.) minus the volume of the particle charge. The total deposition surface area is equal to the surface of this section of the mandrel (about 50 sq. cm.) plus the surface area of the internal wall of this portion of the chamber 13 (about 150 sq. cm.) plus the surface area of the particle charge which is established via the fluidized bed in the active deposition region of the coating apparatus. In this production run, a charge of particles of uranium dicarbide of a density of about 11 gm./cc. is employed wherein the particles are spheroids between about 150 microns and 250 microns in diameter. About 30 grams of these particles are used which provide in and of themselves an additional approximately 800 sq. cm. of surface area in the 5-inch high active deposition region while reducing the void volume less than about 3 cc. At these conditions, the surface to void volume ratio is about 1000 to 125 or about 8 to 1.

With the fluidized bed established under these conditions, the particles and the mandrel are heated to a surface temperature of about 1800° C. At this point, the flow of helium is decreased while simultaneously substituting a like amount of methane so that partial pressure of methane in the stream of upward flowing gas is about 15 volume percent (total pressure of about one atmosphere). Under these conditions, dense isotropic pyrolytic carbon is deposited on the exterior surface of the mandrel in the active deposition region. The rate of deposition of isotropic carbon is about 5 mils per hour. The deposition is conducted at these conditions for about 20 hours so as to deposit a massive pyrolytic carbon structure about one tenth inch thick.

During this process, it should be mentioned that the total surface area in the active deposition region is growing primarily because of the deposition of pyrolytic carbon on the surface of the particles which constitute the fluidized bed. However, from FIGURE 3, it is apparent that within limits this factor will not adversely affect the physical properties of the pyrolytic carbon deposited because such an increase in surface area causes a proportional increase in the density of the pyrolytic carbon which in most instances is desirable. If, for a particular purpose, it is desired that the physical properties of the massive pyrolytic carbon deposited should remain precisely uniform, a proportion of the particles in the fluidized bed can be periodically withdrawn, thereby compensating for the growing surface area of the particle bed by reducing the number of particles. At the completion of the deposition of the desired thickness of massive pyrolytic carbon upon the mandrel, the flow of methane is discontinued and the coating apparatus is allowed to slowly return to ambient temperature.

Examination of the massive carbon deposited shows that it has a density of about 1.9 gm./cc. and a Bacon Anisotropy Factor of about 1.1. The mandrel is removed from the resultant sleeve of massive isotropic pyrolytic carbon, and the sleeve is tested. The thermal conductivity radially and longitudinally is approximately equal. The thermal expansion in both radial and longitudinal directions measures about $5 \times 10^{-6}/°$ C. The sleeve is subjected to neutron irradiation for one month at about 1250° C. during which time the fast flux exposure is estimated to be about $10 \times 10^{20}$ cm.$^2$/sec. nvt (using neutrons of an energy greater than about 0.18 mev.). The dimensional changes which occur are considered to be well below acceptable limits, and no cracks or breaks appear which would be indicative that stresses were present internally of the sleeve. This dense isotropic pyrolytic carbon is considered to have excellent structural strength and to be extremely well suited for numerous uses wherein high temperatures and/or neutron irradiation will be encountered.

Various features of the invention are set forth in the following claims.

What is claimed is:

1. A process for making massive pyrolytic carbon, which process comprises establishing a bed of particles in a chamber in association with a mandrel in the chamber, flowing a vaporous carbon-containing substance through the chamber while heating the particles and the mandrel to a temperature sufficient to cause thermal decomposition of the substance and deposition of isotropic carbon upon the mandrel and upon the particles, and maintaining said flow of the substance for a length of time sufficient to form a massive isotropic carbon deposit upon the mandrel, the ratio of the total deposition surface area, measured in square centimeters, in the active region of the chamber wherein deposition occurs, to the void volume, measured in cubic centimeters, of said active region is maintained at at least about 5 to 1 and no greater than about 20 to 1.

2. A process in accordance with claim 1 wherein said bed of particles is a fluidized bed of particles.

3. A process in accordance with claim 1 wherein said carbon-containing substance is a mixture including methane and an inert gas.

4. A process in accordance with claim 3 wherein said mixture is of methane and helium and contains no more than about 40 volume percent methane.

5. A process in accordance with claim 1 wherein said flow rate and temperature are sufficient to deposit isotropic pyrolytic carbon having a density at least about 1.6 gm./cc.

6. A process in accordance with claim 1 wherein said flow rate is such that the contact time of the gas stream in the active deposition region is not less than about 0.05 second.

7. A process in accordance with claim 1 wherein a vertically extending mandrel is supported in a chamber and a fluidized bed of particles is established by passing a stream of gas upward therethrough, wherein the ratio of the total deposition surface area, measured in sq. cm. to the void volume thereof, measured in cc. is about 8 to 1, and wherein the temperature of the mandrel and particles is maintained at at least about 1600° C., a mixture of helium and methane at about 1 atm. pressure and about 15 volume percent methane is employed at a contact time of about 0.1 second.

References Cited
UNITED STATES PATENTS

| | | | |
|---|---|---|---|
| 2,719,779 | 10/1955 | Bray et al. | 23—209.1 |
| 3,138,434 | 6/1964 | Diefendorf | 23—209.1 |
| 3,172,774 | 3/1965 | Diefendorf | 117—46 |

OSCAR R. VERTIZ, *Primary Examiner.*

EDWARD J. MEROS, *Assistant Examiner.*